Oct. 13, 1925.
F. WEIDERT
1,556,982
MEANS FOR SOFTENING THE CONTOURS OF THE IMAGES OF PHOTOGRAPHIC OBJECTIVES
Filed Sept. 3, 1921
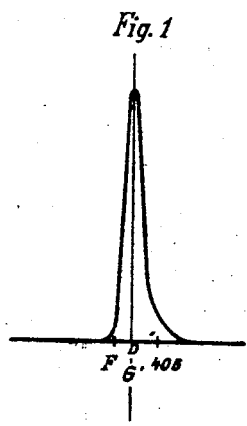
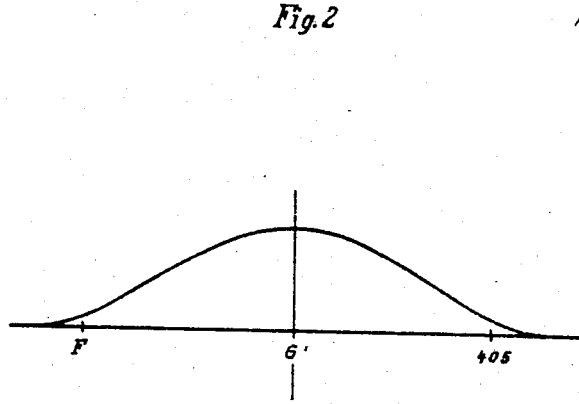
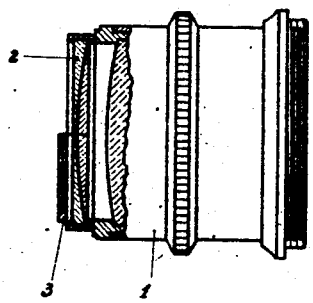
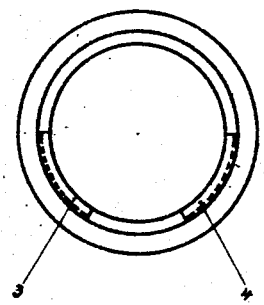
Inventor
Franz Weidert
by
Leo J. Matty Patented Oct. 13, 1925.

1,556,982

UNITED STATES PATENT OFFICE.

FRANZ WEIDERT, OF ZEHLENDORF, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

MEANS FOR SOFTENING THE CONTOURS OF THE IMAGES OF PHOTOGRAPHIC OBJECTIVES.

Application filed September 3, 1921. Serial No. 498,466.

(GRANTED UNDER THE PROVISIONS OF THE ACT OF MARCH 3, 1921, 41 STAT. L., 1313.)

*To all whom it may concern:*

Be it known that I, Dr. FRANZ WEIDERT, a citizen of the German Republic, and resident of Zehlendorf, near Berlin, Germany, physicist, have invented certain new and useful Improvements in Means for Softening the Contours of the Images of Photographic Objectives, for which I have filed applications in Germany on March 10, 1920, and June 2, 1921, of which the following is a specification.

The production of photographic pictures showing artistic soft contours offers many difficulties, and the results secured with methods now in use are not satisfactory in every respect. This invention avoids the difficulties hitherto experienced by inserting into the path of the rays, preferably in front of the objective during the exposure a chromatic compound lens, preferably a chromatic plate. A chromatic compound lens or plate as the term here is used, means a transparent body of cemented lenses adapted to allow rays of a certain wave length to pass without refraction, that is to say a compound lens which is "afocal" for a certain wave length, whereas rays of different wave length undergo refraction when passing through same. If such chromatic compound lens is so calculated that the rays which are mainly operative in producing the photographic image undergo no refraction when passing through said chromatic compound lens, then the insertion of same into the path of the rays does not materially affect the position of the photographic focus, so that the focussing of the image can be effected in the usual manner without a readjustment being necessary if later on the chromatic compound lens is inserted in the path of the rays.

The chromatic compound lens is preferably used in the form of a compound lens with parallel plane outer surfaces, that is to say in the form of a chromatic plate. Such chromatic plate produces for a special wave length only a lateral displacement of the rays passing it, whereas the rays of different wave lengths are so refracted that each wave length has an individual image plane corresponding to it. The effect of such chromatic plate therefore is to move apart the image planes corresponding to the different colours securing thereby the effect of artistic soft contours of the photographic picture.

The essential point is this that the image plane for one special wave length remains unchanged, whereas the image planes for other wave lengths or colours are moved apart; the system being preferably so calculated that the photographic focus remains substantially at the same place. Now it is not always practicable to make the chromatic compound lens in the form of a chromatic plate, it may be that different kinds of glass having the same mean refractive power are not available at all or that the kinds of glass complying with this requirement do not possess sufficiently different dispersive power. This occurs when a strong effect is required which in the case of small differences in dispersive power of the kinds of glass is only obtainable with a highly curved cemented surface of the chromatic plate resulting in a plate of considerable thickness.

Therefore, it is sometimes necessary to make use of kinds of glass which are somewhat different in refractive power for a mean wave length. If however such kinds of glass are used then the compound lens body which fulfills the condition of allowing a certain wave length to pass through without undergoing refraction can no more be made in the form of a plate with parallel plane surfaces, but it is necessary to give it the form of a lens body with at least one curved outer surface. Also such chromatic compound lens body should be so calculated that it does not materially affect the position of the centre of gravity of the photographic actinic image if inserted in the path of the rays during exposure so that focussing of the image on the ground plate can be made as usual and thereafter the chromatic compound lens body inserted in the path of the rays.

Now such compound lens combination produces to a certain degree spherical, astigmatical and chromatical aberration and thus compares unfavorably with a chromatic plate with parallel plane surfaces. It is a matter of course that such curved chromatic compound lens body will be so calculated that the additional aberrations produced by it are kept as insignificant as possible. However in certain cases it may be desirable to allow a certain degree of spherical aberrations for instance if it is intended to produce pictures of the same character as that adherent to pictures produced by the simple meniscus or so-called "monocle" lenses which are oftentimes used for artistic exposures. A monocle lens as the term is used in the art, means a simple lens of meniscus form. Therefore it may be advantageous to make use of chromatic compound lens devices which are to some degree undercorrected with regard to chromatical and spherical aberrations, whereas the other kinds of aberrations are balanced the one with regard to the others as far as possible.

The chromatic compound lens allows the use of object glasses of any kind and requires no special manner of correction of the object glasses in order to secure the effect of artistic soft contours of the image. Therefore, it is possible to produce with the same object glass pictures of highest distinctness and also by cooperation with the chromatic compound lens or plate pictures showing artistic soft contours, the quality of the last named pictures being advantageously distinguished from that of pictures produced in accordance with other methods that the pictures in spite of their soft contours show a precise design, this depending on the fact that the single image points in all parts of the picture have a distinct centre as will be later on explained.

The effect produced by the chromatic compound lens or plate on the character of the image and a special constructional device for inserting it into the path of the rays are illustrated on the annexed drawings.

Figure 1 shows a diagram of the photographic light intensity of the several active wave lengths in connection with an ordinary chromatically corrected object glass as a function of the position of the corresponding image.

Figure 2 is a diagram of the photographic light intensity similar to Figure 1 resulting if a chromatic plate is inserted in front of the object glass.

Fig. 3 shows a front view of a mounting for an object glass and Fig. 4 a side elevation of the object glass mounting of Fig. 3 partly in section.

In Figs. 1 and 2 the letters D, F. G' designate so-called Frauenhofer lines in the spectrum usually designated with said letters; the numeral 405 designates the line in the spectrum having the wave length of 405 μ μ.

The figures show that in connection with a photographic object glass which has been chromatically corrected in the usual manner the photographic light intensity is substantially concentrated at one definite point of the axis of the object glass. This results from the fact that the object glasses are so calculated that the light rays for the D line of the spectrum and for the G' line are assembled in the same point of the axis.

If however a chromatic plate (or chromatic compound lens) is inserted in the path of the rays in front of the object glass, which chromatic plate is so calculated that it allows the rays of the wave length G' to pass without refraction, then the light intensity diagram is axially extended, however, in such a way that in contradistinction to an object glass which is not chromatically corrected the line of gravity of the light mountain diagram remains at the same place of the axis, where on focussing the image on the ground plate the line of gravity of the light mountain of the visually active rays was positioned. This centre of gravity of light action which is positioned for ordinary photographic plates at the image point of the rays having a wave length corresponding to the G' line results for each image point in a sharp nucleus corresponding to the decrease in light intensity on both sides of the plane of adjustment.

Although a chromatic plate showing undercorrection may as well be used as a plate showing overcorrection, it is in most cases more advantageous to use an overcorrected chromatic plate, because the photographic objectives in use in view of the character of their secondary spectrum for the photographically actinic rays show for themselves a slight chromatic overcorrection which assists the plate in its action, so that the chromatic plate in order to produce the same circles of dispersion in this case can be somewhat weaker than an undercorrecting plate which must counteract the secondary spectrum of the objective. If the chromatic plate is used for exposures with orthochromatic plates and with yellow light filter then in view of the opposite position of the secondary spectrum within the region which now is in question, of course, it will be more advantageous to use an overcorrecting chromatic plate.

The diagram of Figure 2 corresponds to the effect of an overcorrecting chromatic plate.

If orthochromatic photographic plates are used, then the curve of intensity in the case of the insertion of a chromatic plate in front of the objective would still be more extended towards the region of light of great wave lengths than indicated in Figure 2. Besides the curve of intensity appearing in Figure 2 a further branch would appear lying on the other side of the point corresponding to line F. In this case this part of the curve of intensity and consequently the images of the yellow-green rays would be formed outside the plane of the photographic plate if the same chromatic plate would be used, whereas that portion of the rays next line G' would be cut off by the yellow light filter. In this case the image would not be correctly focussed, because the image points of the active rays would be positioned in front of the plane of the photographic plate. In order to avoid this the chromatic plate to be used must in this case be calculated in a different manner, namely so that it allows those rays which correspond to the centre of gravity of photographic light effect with orthochromatic plates and yellow light filters to pass without refraction, so that the sharp images of all active rays again are positioned symmetrically on both sides of the plane of the photographic plate.

The use of the chromatic plate above described requires that said plate can be inserted as quick as possible after each focussing of the image. Figures 3 and 4 show an arrangement enabling such quick insertion of the chromatic plate.

According to Figures 3 and 4 the object glass mounting 1 is provided with a support for a chromatic plate 2, such support consisting of two hollow segments 3, 4.

In order to insert the chromatic plate 2 in the path of the rays in front of the object glass, it is only necessary after focussing of the image in the usual way to position the chromatic plate 2 on segments 3, 4 before the exposure is made. After exposure the chromatic plate can easily be removed.

The following are the constructional dates for two chromatic cemented compound lenses afocal for the line G' of the spectrum suitable for use in connection with the photographic object glass of usual correction having a focal length of 42 cm. and a ratio of aperture of 1:4.5.

1. Afocal chromatic plate with plane parallel outer surfaces.

$L_1: r_1 = \infty$
   $r_2 = +167.5$  $d_1 = 3.0$  $n_D = 1.62160$  $n_{G1} = 1.63522$  $n_{40s} = 1.63981$ $L_2: r_3 = -167.5$
   $r_4 = \infty$  $d_2 = 11.0$  $n_D = 1.61296$  $n_{G1} = 1.63490$  $n_{40s} = 1.64284$ 2. Afocal compound lens combination with two curved outer surfaces.

$L_1: r_1 = +444.4$
   $r_2 = +250.4$  $d_1 = 11.5$  $n_D = 1.61551$  $n_{G1} = 1.63770$  $n_{40s} = 1.64576$ $L_2: r_3 = -250.4$
   $r_4 = -397.2$  $d_2 = 4.5$  $n_D = 1.59940$  $n_{G1} = 1.61276$  $n_{40s} = 1.61729$

What I claim is:—

1. The combination of an objective for a photographic camera, a tubular casing for said objective, a chromatic compound lens which is afocal for a special wave length, and means for detachably connecting said chromatic lens with said tubular casing in front of said objective.

2. The combination with an objective for a photographic camera, a tubular casing for said objective, a chromatic compound lens afocal for a special wave length and means for detachably connecting said chromatic compound lens with the tubular casing of the objective, the chromatic compound lens being so calculated that its aberrations are reduced as much as possible and the aberrations of the several kinds balanced with relation to each other.

3. The combination with an objective for a photographic camera, a tubular casing for said objective, a chromatic compound lens afocal for a special wave length and means for detachably connecting said chromatic compound lens with the tubular casing of the objective, said chromatic compound lens being so calculated that it is somewhat undercorrected with relation to chromatical and spherical aberration, whereas aberrations of other kinds are kept low and balanced with relation to each other.

4. The combination with an objective for a photographic camera, a tubular casing for said objective, a chromatic compound plate having parallel plane outer surfaces and allowing only rays of a special wave length to pass therethrough without refraction and means for detachably connecting said chromatic plate with the tubular casing of the objective.

5. The combination with an objective for a photographic camera, a tubular casing for said objective, a chromatic compound lens afocal for a special wave length and means for detachably connecting said chromatic compound lens with the tubular casing of the objective, the chromatic compound lens being so calculated that it does not materially affect the position of the photographic focus of the objective.

In testimony whereof I have signed this specification.

Dr. FRANZ WEIDERT.